United States Patent [19]

Spors

[11] 3,745,393
[45] July 10, 1973

[54] BRUSH HOLDER FOR DYNAMOELECTRIC MACHINE

[75] Inventor: James A. Spors, West Bend, Wis.

[73] Assignee: Briggs & Stratton Corporation, Wauwatosa, Wis.

[22] Filed: Apr. 28, 1972

[21] Appl. No.: 248,447

[52] U.S. Cl.............................. 310/239, 310/247
[51] Int. Cl............................................ H01r 39/38
[58] Field of Search.................... 310/239, 242, 247

[56] References Cited
UNITED STATES PATENTS

| | | | |
|---|---|---|---|
| 3,573,522 | 4/1971 | Pentland | 310/239 |
| 3,493,802 | 2/1970 | Barthruff et al. | 310/239 |
| 3,159,763 | 12/1964 | Colvill et al. | 310/239 X |

Primary Examiner—J. D. Miller
Assistant Examiner—Robert J. Hickey
Attorney—Ira Milton Jones

[57] ABSTRACT

A brush holder for a dynamoelectric machine comprises a molded carrier and a stamped washer-like member. The carrier is annular and has radially elongated brush receiving recesses, each of which opens radially inwardly and also opens unrestrictedly to one axial surface of the carrier so that it can be molded without need for movable cores. The washer-like member flatwise overlies said surface of the carrier, closing said recesses. Screws fasten the carrier and washer-like member into an end bell and also serve as terminals for grounded brush leads.

8 Claims, 6 Drawing Figures

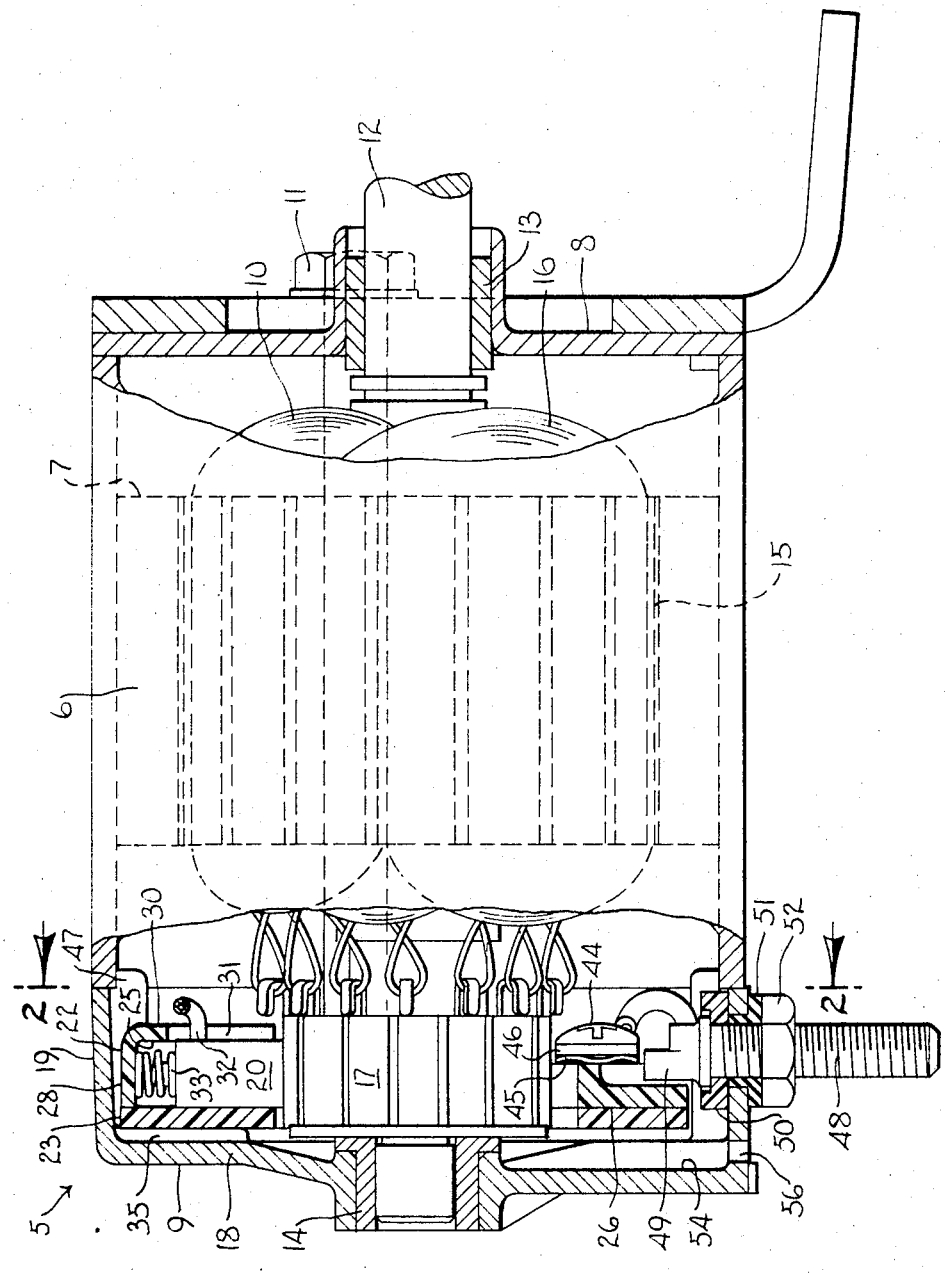

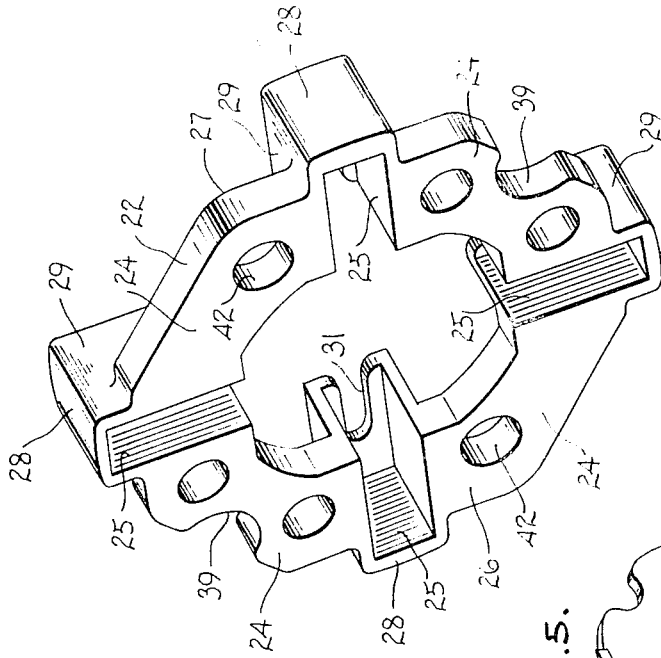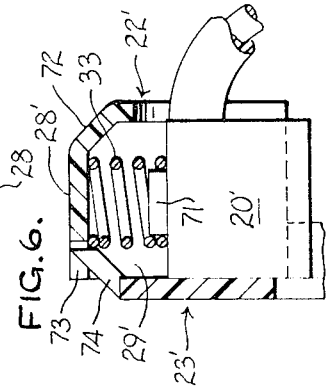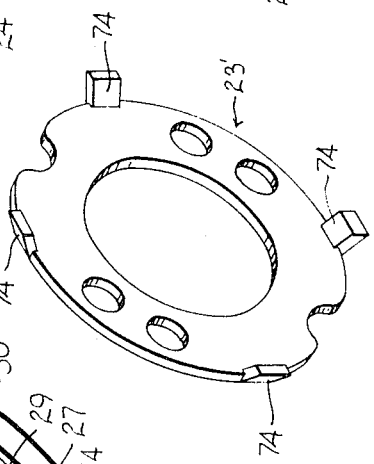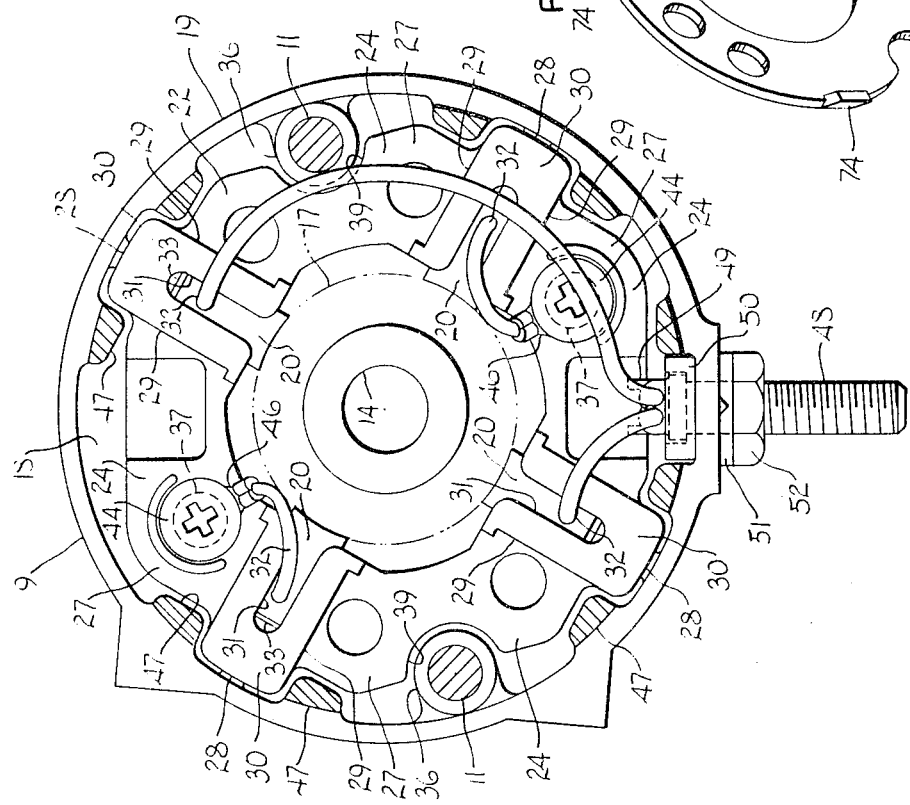

BRUSH HOLDER FOR DYNAMOELECTRIC MACHINE

This invention relates to brush holders for dynamoelectric machines, and is more particularly concerned with brush holders for relatively small fractional horsepower electric motors and the like.

The brushes of a motor or generator that has a commutator must be confined to sliding motion in directions generally radial to the axis of the machine and must be biased in the radially inward direction by means of springs. Ordinarily, therefore, each brush is slidably received in a generally tubular brush holder, and each brush holder is so mounted on the frame of the motor or generator as to insure the proper orientation and location of the brush that it carries.

Through the many years that small commutator motors have been made, numerous brush holder expedients have been devised. Undoubtedly all of them were intended to be as simple and inexpensive as possible, but even those that attained a fair degree of simplicity were still rather expensive to manufacture. Many prior brush holders that could be quickly and easily assembled required costly, specialized or slow working equipment for manufacture of their component parts. On the other hand, where the components of prior brush holders were individually inexpensive in themselves, their assembly with one another and with other parts of the motor was often difficult and costly.

Thus the brush holder of a commutator motor or generator has always posed a problem of cost, in addition to the obvious functional problems that it presents such as insuring proper brush location and orientation, providing for good sliding action of the brushes and proper biasing force upon them, maintaining good electrical connections between the brushes and the terminals of the machine, and minimizing the possibility of short circuits within the machine.

With these considerations in mind, it is a general object of the present invention to provide a brush holder that is especially well suited for small motors and generators by reason of its compactness and its ease and simplicity of assembly, which brush holder comprises only two very simple and inexpensive main parts, one of which can be very quickly and cheaply injection molded by means of rapid cycle equipment requiring no movable core members, and the other of which can be stamped from flat sheet material.

Obviously the advantages of a simple and inexpensive brush holder are of little value if the cost of other parts of the machine must be increased in order to accommodate it; and therefore the present invention has as another of its objects the provision of a brush holder which is adapted for very quick and easy assembly with an end bell of the machine in which the brush holder is installed and which allows the end bell to be manufactured as a rather simple die casting with the use of very inexpensive mold tooling.

It is also an object of this invention to provide a brush holder assembly that comprises a generally annular main carrier member that can be very inexpensively molded of insulating plastic material and can be received in a motor end bell to be properly established and held in position thereby, and wherein the carrier member, by reason of its unitary construction and its cooperation with the end bell, insures correct location and orientation of the brushes relative to one another and the commutator.

It is also an object of this invention to provide a brush assembly for a commutator motor or generator, wherein the brushes and their springs are almost completely enclosed in insulating material, and in which there are simple, inexpensive and reliable electrical connections between the brushes and an end bell that carries a holder for the brushes.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which:

FIG. 1 is a view in side elevation, with portions shown cut away, of an electric motor having a brush assembly embodying the principles of this invention;

FIG. 2 is a view in section taken on the plane of the line 2—2 in FIG. 1;

FIG. 4 is a perspective view of the molded carrier which is a main component of the brush holder;

FIG. 5 is a perspective view of the washer-like member of a modified embodiment of the brush holder of this invention; and FIG. 6 is a fragmentary sectional view, taken radially through a brush holder tube, of the modified form of brush holder that comprises the washer-like member shown in FIG. 5.

Figure 3:
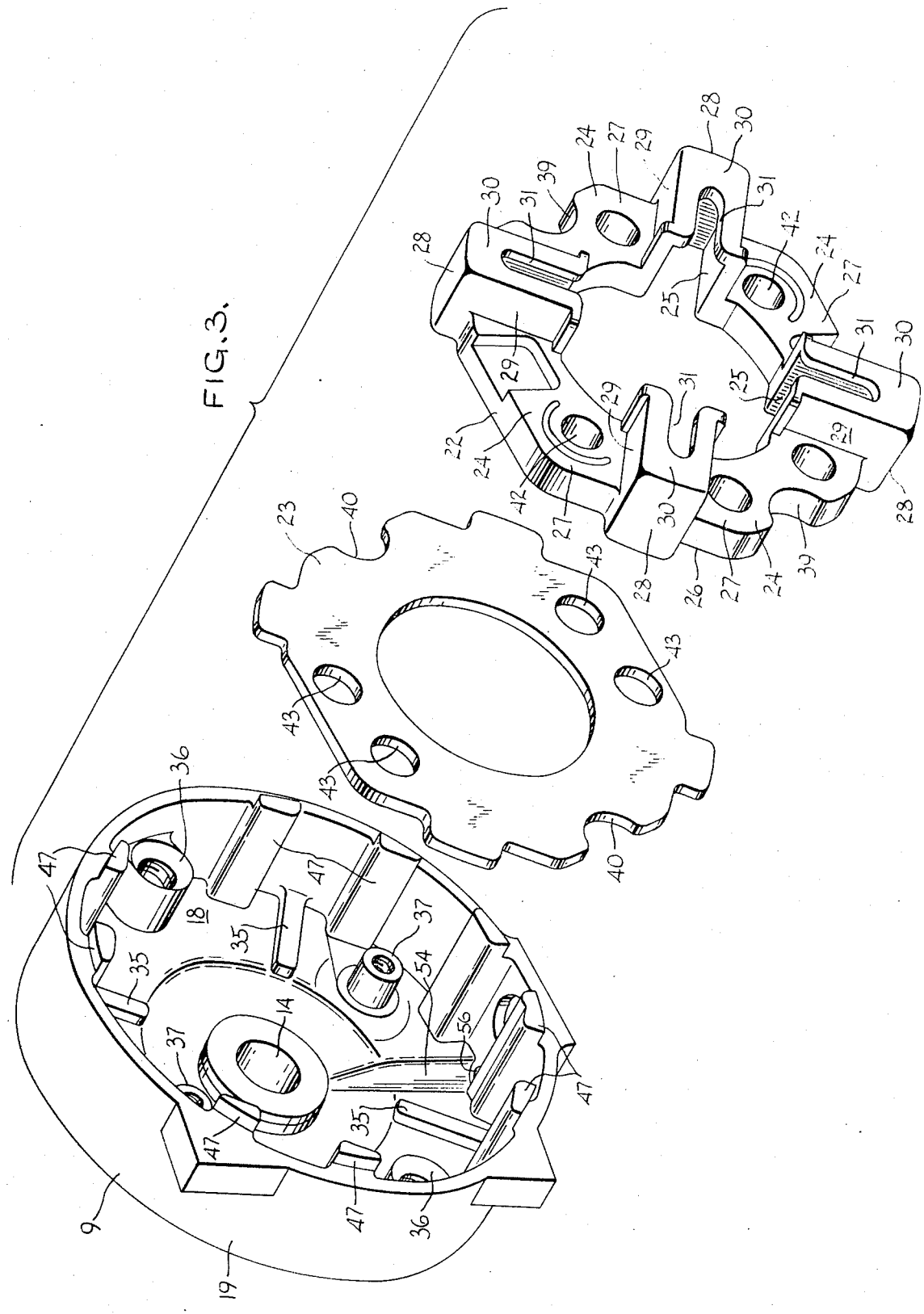
FIG. 3 is an exploded perspective view of the components of the brush holder of this invention in their relation to the motor end bell in which they are housed.

Referring now to the accompanying drawings, the numeral 5 designates generally a small dynamoelectric machine of the type to which the present invention is particularly well suited, here illustrated as a fractional horsepower motor and more specifically as a starting motor for a single cylinder gasoline engine.

The motor 5, as is generally conventional, has a frame or housing comprising a substantially cylindrical medial portion 6 that closely embraces a stator 7, here illustrated as having a permanent magnet field. Opposite end closures 8 and 9 are coaxially secured to the opposite ends of the cylindrical portion 6 to cooperate therewith in providing an enclosure for the stator 7 and a rotor or armature 10. The end closures are secured to the cylindrical portion 6 by through bolts 11. The end closure 8 at the anti-commutator end of the motor can be of any suitable shape; the end closure 9 at the commutator end of the motor is a so-called end bell that is generally cup-shaped, with an end wall 18 and a circumferential side wall 19.

The shaft 12 of the armature is journaled in bearings 13 and 14 which are coaxially secured in the respective end closures 8 and 9. The armature has the usual laminated core portion 15, concentrically secured to its shaft and provided with slots in which windings 16 are received. The windings are connected to the segments of a drum-like commutator 17 which is secured to the shaft in axially spaced relation to one end of the core, within the embrace of the circumferential wall 19 of the end bell 9. Brushes 20 that engage the commutator are likewise embraced by the circumferential wall 19.

For purposes of illustration the motor is shown as having four brushes 20, circumferentially equispaced around the commutator, but it will be apparent as the description proceeds that the principles of this invention apply equally well to a dynamoelectric machine having any other number and arrangement of brushes.

The brushes are slidably confined in brush holder means comprising a molded annular carrier 22 and a washer-like member 23, both made of insulating material. The carrier 22 is preferably made of a thermosetting plastic, such as a phenolic resin, and, for reasons that will appear as the description proceeds, it can be molded without the use of movable coring so that it lends itself to production on inexpensive rapidly cycling injection molding equipment. The washer-like member 23 can be stamped out of laminated paper or fabric that is impregnated with a plastic material which can also be a phenolic resin; or it can be molded of a plastic like that of the carrier.

In general, the carrier 22 is annular; its outside diameter is such that the carrier can be closely recieved within the circumferential side wall 19 of the cup-shaped end bell 9, and its inside diameter is such that the commutator 17 can be received in it with a suitable clearance.

The carrier can be considered as comprising segments 24 of a flat but somewhat thick annulus, which segments are separated from one another at circumferentially spaced intervals by brush grooves or recesses 25, but are connected by web-like portions that define parts of the walls of the brush recesses. The segments 24 are substantially thicker than the washer-like member 23, and the annulus that they define has a flat rear (axially outer) surface 26 which the washer-like member 23 flatwise overlies. The segments also have substantially flat and coplanar front (axially inner) surfaces 27.

Each groove-like brush recess 25 is elongated radially of the carrier and has a cross section which is uniform along its length and such as to guide a brush therein for sliding motion in directions radial to the carrier. Each recess opens unrestrictedly radially inwardly, so that a brush can project from the inner end of the recess to the extent necessary for engagement with the commutator. Each recess also opens unrestrictedly to the flat rear surface 26 of the carrier, and therefore the carrier has no undercuts that entail the need for movable coring in the equipment for molding it.

The above mentioned web-like portions of the carrier that connect its segments 24 include an integral circumferentially extending wall portion 28 which extends across and closes the radially outer end of each brush recess. This end wall 28 is disposed a little outwardly of the periphery of the carrier body proper.

The side surfaces of each recess are defined in part by integral radially extending side wall portions 29 that project forwardly beyond the front surface 27 of the carrier body. At its front each recess is closed by an integral front wall portion 30 that bridges the side wall portions 29 and connects with the circumferential end wall portion 28. This front wall portion, however, has a rather long and relatively wide slot 31 in it through which a brush lead conductor 32 connects with the brush in the recess, near the radially outer end of the brush. The slot 31 is elongated in the radial direction of the carrier and opens radially inwardly, and because of it the front wall portion 30 has the character of a relatively wide rim or flange that projects over the recess from the side wall portions 29 and the end wall portion 28.

The washer-like member 23, which flatwise overlies the rear (axially outer) surface 26 of the carrier, closes the open rear of each recess and thus cooperates with the carrier to define a well for each brush that opens radially inwardly and in which the brush has a slidable fit. Also received in each of these wells is a coiled compression spring 33 which biases the brush radially inwardly, towards the commutator, and which is confined between the brush and the circumferentially extending end wall 28 of its recess.

To establish the brush holder parts 22 and 23 at the proper axial position relative to the commutator, the end bell 9 has radially extending lands 35 on the inner surface of its end wall. They define coplanar surfaces normal to the rotor axis and are flatwise engaged by the washer-like member 23.

To establish the carrier 22 in its proper angular orientation the end bell has certain screw receiving axial bosses 36 and 37 that project axially inwardly from its end wall and fit closely in registering apertures in the carrier and the washer-like member. Two of these bosses, designated 36, have threaded bores to receive the through bolts 11 and are located closely adjacent to the circumferential side wall 19 of the end bell, diametrically across from one another. They are accommodated in arcuate cutouts or notches 39 and 40 in the carrier and the washer-like member, respectively. The other two bosses 37 are circumferentially spaced from the bosses 36 as well as being spaced radially inwardly from the end bell side wall 19. These project through registering holes 42 and 43 in the carrier and washer-like member, respectively, and receive screws 44 that secure those parts to the end bell in addition to serving as connections between grounded brush leads 32 and the motor frame.

A wave washer 45, surrounding each boss 37 and reacting between the head of the screw 44 therein and the carrier, insures firm axial seating of the carrier and the washer-like member against one another and the lands 35. A terminal connector 46 on each grounded brush lead has an eyelet portion that is confined between the head of the screw and inner end of the boss 37 and is large enough to overlie the wave washer. The terminal connector thus cooperates with the screw 44 and the wave washer 45 to confine the carrier against axial motion, and itself has a good electrical connection with the end bell.

Each of the bosses 37 is spaced at unequal circumferential distances from the two bosses 36, but the two bosses 37 are centered on a line through the bearing axis. Therefore, to allow the washer-like member 23 to be quickly installed in the end bell with either of its faces innermost, it is provided with two holes 43 for each of the bosses 37.

Proper angular orientation of the carrier 22 in the end bell is further assured by pairs of axially extending ribs 47 on the inner surface of the circumferential side wall 19 of the end bell 9. The end wall 28 of one of the recess defining portions of the carrier is closely received between each pair of these ribs. Note that the ribs 47 can project axially beyond the rim of the end bell a short distance, to engage inside the rim of the cylindrical medial portion 6 of the motor housing and thus maintain concentricity of the frame parts.

It will be understood that the correct angular orientation of the end bell 9 relative to the rest of the motor is maintained by the through bolts 11, which extend through closely fitting holes in the stator core and are engaged in the bosses 36 in the end bell.

The ungrounded terminal of the motor comprises a screw 48 which extends through the circumferential side wall 19 of the end bell 9 and which has a novel head 49 at the interior of the end bell that provides for connection of brush lead conductors to it. Plastic insulators 50 and 51 prevent the screw from contacting the metal of the end bell, and a nut 52 holds the screw in place with its shank portion projecting radially outwardly from the end bell to serve as a supply lead terminal.

The head portion of the terminal screw 48 is square in outline as viewed along the screw axis, and it has a wide slot across it that defines a pair of parallel upstanding flanges. End portions of the two leads that are to be connected to the screw are placed between these flanges, and the flanges are sheared down the middle, in the direction of the screw axis, to divide each flange into front and rear lips. Simultaneously with such shearing the rear lips of the two flanges are crimped inwardly over the leads, and then a resistance welding prod is applied to the portions of the two leads that lie between the still upstanding front lips of the flanges to insure an excellent mechanical and electrical connection between the leads and the screw head. The connector here briefly described is disclosed in more detail and claimed in the copending application of J. A. Spors, Ser. No. 247,161, filed Apr. 24, 1972.

To provide for drainage of moisture out of the interior of the motor, the end wall 18 of the end bell 9 has a radially extending groove 54 in its inner surface that communicates with a small drain hole 56 in the circumferential side wall of the end bell.

It will be apparent that the brush holder of this invention is assemblied by inserting the washer-like member 23 and the carrier 22 into the end bell 9, in that order, then securing them by threading the screws 44 into the bosses 37, slipping the wave washers 45 and terminal connectors 46 onto those screws as they are installed. The terminal screw 48 is then installed through the side wall of the end bell, with the ungrounded brush leads connected to it. Brush springs are inserted axially into the brush wells, and then the brushes are slid into those wells, all from the center of the carrier. The end bell 9 with its brush assembly can then be assembled with the other parts of the motor.

The embodiment of the invention illustrated in FIGS. 5 and 6 is intended for a larger motor than that which incorporates the brush holder described above. The brushes of that larger motor are markedly rectangular in cross section, rather than approximately square, and their larger cross-section dimension is parallel to the motor axis. The brush holder tubes conjointly defined by the carrier 22' and the washer-like member 23' must have a corresponding rectangular cross-section, but the brush springs 33 are of course round in cross-section and the springs must therefore be confined against shifting in said tubes in directions parallel to the motor axis.

To prevent such undesired shifting of the springs 33, each brush 20' has at its radially outer end an integral tit-like boss 71 upon which the radially inner end of its spring is piloted, and the circumferentially extending wall portion 28' of each brush recess is a square part to provide a seat for the outer end of the spring. To define this square wall portion, the radially outermost portion 72 of the front wall of each brush recess is inclined rearwardly and radially outwardly, and the rear edge of the circumferentially extending wall portion 28 is spaced a distance forwardly of the rear surface of the carrier, leaving a slot 73 between the side wall portions 29 at their radially outer ends.

In this case the washer-like member 23' is made as a molded part and has integral tabs 74 at its outer periphery which are inclined forwardly and radially outwardly and which are received in the slots 73 to close them.

From the foregoing description taken with the accompanying drawings, it will be apparent that this invention provides a holder for the brushes of a dynamoelectric machine taht satisfies all of the mechanical and electrical requirements for a good brush assembly and, in addition, comprises very few and simple parts that are capable of being produced at very low cost and of being very quickly and easily assembled with one another and with the rest of the machine.

Those skilled in the art will appreciate that the invention can be embodied in forms other than as herein disclosed for purposes of illustration.

The invention is defined by the following claims:

1. Means for mounting brushes of a dynamoelectric machine having a rotor with a shaft and having a generally cup-shaped end bell that concentrically supports a bearing for the shaft and comprises an enclosure for the brushes and the brush mounting means, said brush mounting means comprising:

A. a substantially annular brush carrier of insulating material received in the end bell and closely embraced by its circumferential wall to be held concentric therewith, said carrier having circumferentially spaced apart radially elongated recesses, each defined by 1. opposed radially extending and circumferentially facing surface portions on the carrier between which a brush is lengthwise slidably confined against circumferential displacement, and 2. a wall portion near one axial side of the carrier that connects portions of the carrier at opposite sides of the recess and confines the brush against axial motion in one direction, each of said recesses opening radially inwardly relative to the carrier and also opening unrestrictedly to the other axial side of the carrier so that the carrier can be molded without the need for movable coring;

B. a flat washer-like member of insulating material in the end bell, closely embraced by said circumferential wall to be confined against edgewise motion thereby and confined in flatwise overlying relationship to said other axial side of the carrier to close the open axial side of each recess and confine a brush therein to lengthwise sliding motion; and C. means securing the carrier and the washer-like member against rotational and axial displacement relative to the end bell.

2. In a dynamoelectric machine having a rotor with a shaft and with a concentric commutator which is engaged by brushes and which is spaced axially inwardly from one end of the shaft, and having a cup-shaped end bell that concentrically supports a bearing for said end of the shaft and comprises an enclosure for the brushes and commutator;

A. a flat, washer-like member of insulating material closely embraced by the circumferential wall of the end bell to be held concentric therewith and having a concentric hole of a size to receive the commutator;

B. means in the end bell spacing said washer-like member axially inwardly from the bearing and disposing it with its surfaces normal to the bearing axis;

C. an annular carrier in the end bell, closely embraced by said circumferential wall, made of insulating material and having an axially facing surface flatwise overlying the washer-like member, said carrier also having circumferentially spaced apart portions that define radially elongated recesses which open unrestrictedly to said surface of the carrier so that the carrier can be molded without the need for movable coring, said recesses also opening radially inwardly so that said portions of the carrier cooperate with the washer-like member to define radially inwardly opening wells in which the brushes are receivable, and said carrier having wall portions adjacent to its opposite axial surface which extend across said recesses to cooperate with the washer-like member in confining the brushes against motion axially of the carrier and to connect said circumferentially spaced apart portions; and D. means securing the carrier and the washer-like member against rotational and axial displacement relative to the end bell.

3. The dynamoelectric machine of claim 2, further characterized by:

E. said means spacing said washer-like member axially inwardly from the bearing comprising a plurality of circumferentially spaced, radially extending lands on the inner surface of the end bell end wall.

4. The dynamoelectric machine of claim 3, further characterized by said means securing the carrier and the washer-like member comprising:

F. a plurality of bosses projecting axially inwardly from the end wall of the end bell through registering holes in the washer-like member and the carrier, the holes in the carrier being spaced from said recess-defining portions thereof;

G. a screw threaded into each of said bosses from the axially inner end thereof; and H. a wave washer surrounding each boss and cooperating with the head of the screw therein to confine the washer-like member and the carrier axially against one another and said lands on the end bell end wall.

5. The dynamoelectric machine of claim 4, further characterized by:

I. each of said recesses in the carrier being closed at its radially outer end by another wall portion of the carrier that extends circumferentially relative thereto;

J. a compression spring in each recess, reacting between said other wall portion and the brush in the recess to bias the brush radially inwardly; and K. each of said first mentioned wall portions having a slot that is elongated radially relative to the carrier and which opens radially toward the center of the carrier, through which slot a conductor lead extends that is connected with the brush in the recess.

6. The dynamoelectric machine of claim 5, further characterized by:

L. at least one conductor lead being connected with one of said screws to ground its brush to the end bell.

7. The dynamoelectric machine of claim 6, further characterized by:

M. another screw extending through the circumferential wall of the end bell, with its head at the interior thereof, to provide a terminal to which a supply lead can be connected;

N. means insulating said other screw from the end bell; and

O. means connecting at least one other of the conductor leads to said other screw.

8. Means for mounting brushes of a dynamoelectric machine having a rotor with a shaft and having a cup-shaped end bell that concentrically supports a bearing for the shaft and comprises an enclosure for the brushes and the brush mounting means, said brush mounting means comprising:

A. a substantially annular brush carrier of insulating material having circumferentially spaced radially elongated grooves therein that open radially inwardly and also open unrestrictedly to only one axial side of the carrier, each of said grooves being of a size to receive a brush and a compression spring by which the brush is biased radially inwardly, and said carrier having a circumferentially extending wall portion across the radially outer end of each of said grooves against which the spring can react and other wall portions that define the bottoms of said grooves and guidingly confine the brushes against displacement toward the other axial side of the carrier;

B. a flat washer-like member overlying the first mentioned axial side of the carrier to close said grooves at said side of the carrier and thereby cooperate with said other wall portions to confine a brush in each groove to motion lengthwise of it; and C. cooperating means on the carrier, the washer-like member and the end bell for holding the carrier and washer-like member concentric to the end bell and with the washer-like member normal to the axis of the bearing and flatwise contiguous to said side of the carrier.

* * * * *